(12) United States Patent
Miwa et al.

(10) Patent No.: US 9,440,636 B2
(45) Date of Patent: Sep. 13, 2016

(54) VIBRATION DAMPING CONTROL APPARATUS

(75) Inventors: Koji Miwa, Susono (JP); Takashi Kawai, Gotemba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 84 days.

(21) Appl. No.: 14/373,966

(22) PCT Filed: Jan. 31, 2012

(86) PCT No.: PCT/JP2012/052147
§ 371 (c)(1),
(2), (4) Date: Jul. 23, 2014

(87) PCT Pub. No.: WO2013/114569
PCT Pub. Date: Aug. 8, 2013

(65) Prior Publication Data
US 2014/0371967 A1 Dec. 18, 2014

(51) Int. Cl.
*B60W 10/08* (2006.01)
*B60K 6/445* (2007.10)
*B60W 30/20* (2006.01)
*B60W 10/06* (2006.01)
*B60W 20/00* (2016.01)

(52) U.S. Cl.
CPC .............. *B60W 10/08* (2013.01); *B60K 6/445* (2013.01); *B60W 10/06* (2013.01); *B60W 20/10* (2013.01); *B60W 20/15* (2016.01); *B60W 20/40* (2013.01); *B60W 30/20* (2013.01); *B60W 2030/206* (2013.01); *B60W 2510/0657* (2013.01); *B60W 2510/0695* (2013.01); *B60W 2710/083* (2013.01); *Y02T 10/6239* (2013.01)

(58) Field of Classification Search
CPC .... B60W 10/04; B60W 10/06; B60W 10/08; B60W 20/10; B60W 20/108; B60W 20/40; B60W 30/20; B60W 2030/206; B60W 2510/0657; B60W 2710/083
See application file for complete search history.

(56) References Cited

FOREIGN PATENT DOCUMENTS

| JP | H11-350998 A | 12/1999 |
|----|--------------|---------|
| JP | 2004-312857 A | 11/2004 |
| JP | 2006-232167 A | 9/2006 |
| JP | 2010-274875 A | 12/2010 |

*Primary Examiner* — Spencer Patton
(74) *Attorney, Agent, or Firm* — Kenyon & Kenyon LLP

(57) ABSTRACT

A vibration damping control apparatus is mounted on a hybrid vehicle provided with an engine and a motor generator coupled with the engine. The vibration damping control apparatus (i) calculates pulsating torque of the engine and inertia torque of the engine, (ii) sets, as consumption torque, a value obtained by subtracting the inertia torque from the pulsating torque, (iii) sets, as shaft torque of an output shaft of the engine, a value obtained by subtracting the consumption torque from base torque of the motor generator, (iv) calculates vibration damping torque which is torque for suppressing a variation in the shaft, and (v) controls the motor generator such that torque outputted from the motor generator is a sum of the base torque and the vibration damping torque.

7 Claims, 6 Drawing Sheets

(a)

(b)

(c) If cranking and pulsating torque simultaneously occur (in practice)

VIBRATION DAMPING CONTROL APPARATUS

CROSS-REFERENCE TO RELATED APPLICATIONS

This is a national phase application based on the PCT International Patent Application No. PCT/JP2012/052147 filed Jan. 31, 2012, the entire contents of which are incorporated herein by reference.

TECHNICAL FIELD

The present invention relates to a vibration damping control apparatus mounted on a vehicle such as, for example, a hybrid vehicle.

BACKGROUND ART

As this type of apparatus, for example, there is proposed an apparatus for controlling a motor generator to maintain the number of revolutions which is equal to the sum of a rotational speed variation of the motor generator and the target number of revolutions, wherein the rotational speed variation is calculated from the moment of inertia of the motor generator and a torque variation associated with compression torque of an engine, and the torque variation is calculated from an engine rotational speed and an engine crank angle (refer to Patent document 1).

Alternatively, there is proposed an apparatus for performing vibration damping control on torque obtained by calculating an inertia torque variation of the engine and an inertia torque variation of the motor generator and by adding the calculated inertia torque variation of the engine and the calculated inertia torque variation of the motor generator (refer to Patent document 2).

Alternatively, there is proposed an apparatus in which output torque per cycle is set as engine shaft torque and a value obtained by subtracting engine inertia torque from the engine shaft torque is set as engine output torque (refer to Patent document 3). Alternatively, there is proposed an apparatus for performing the vibration damping control on torque obtained by adding generated torque generated according to an engine operating state and reciprocating inertia torque generated according to the engine rotational speed (refer to Patent document 4).

PRIOR ART DOCUMENT

Patent Document

Patent document 1: Japanese Patent Application Laid Open No. 2010-274875
Patent document 2: Japanese Patent Application Laid Open No. 2004-312857
Patent document 3: Japanese Patent Application Laid Open No. 2006-232167
Patent document 4: Japanese Patent Application Laid Open No. Hei 11-350998

SUMMARY OF INVENTION

Subject to be Solved by the Invention

According to the Background Art described above, however, there is room for improvement in the vibration damping control in a transitional period of the number of revolutions of the engine such as, for example, when the engine starts or stops, which is technically problematic.

In view of the aforementioned problem, it is therefore an object of the present invention to provide a vibration damping control apparatus configured to preferably perform the vibration damping control even in the transitional period of the number of revolutions of the engine.

Means for Solving the Subject

The above object of the present invention can be solved by a vibration damping control apparatus mounted on a hybrid vehicle comprising an engine and a motor generator coupled with the engine, said vibration damping control apparatus is provided with: a pulsating torque calculating device configured to calculate pulsating torque of the engine; a first inertia torque calculating device configured to calculate first inertia toque which is inertia torque of the engine; a consumption torque calculating device configured to set, as consumption torque, a value obtained by subtracting the calculated first inertia torque from the calculated pulsating torque; a vibration damping torque calculating device configured to set, as shaft torque of an output shaft of the engine, a value obtained by subtracting the calculated consumption torque from base torque of the motor generator, and to calculate vibration damping torque which is torque for suppressing a variation in the shaft torque; and a controlling device configured to control the motor generator such that torque outputted from the motor generator is a sum of the base torque and the calculated vibration damping torque.

According to the vibration damping control apparatus of the present invention, the vibration damping control apparatus is mounted on a hybrid vehicle provided with an engine and a motor generator coupled with the engine. The motor generator may be coupled with the engine via a member such as, for example, a damper. The motor generator is typically a motor generator for engine control, but may be a motor generator for driving of the hybrid vehicle.

The pulsating torque calculating device, which is provided with, for example, a memory, a processor and the like, calculates pulsating torque of the engine. The "pulsating torque" of the present invention means the sum of compression torque and reciprocating inertia torque of a piston system of the engine. The details of a method of calculating the pulsating torque are omitted because various known aspects can be applied.

The first inertia torque calculating device, which is provided with, for example, a memory, a processor and the like, calculates first inertia toque which is inertia torque of the engine. The "first inertia torque" of the present invention means torque generated with a change in the number of revolutions of the engine. Thus, the first inertia torque is not generated in a steady state in which there is no change in the number of revolutions of the engine. The details of a method of calculating the first inertia torque are omitted because various known aspects can be applied.

The consumption torque calculating device, which is provided with, for example, a memory, a processor and the like, outputs, as consumption torque, a value obtained by subtracting the calculated first inertia torque from the calculated pulsating torque.

The vibration damping torque calculating device, which is provided with, for example, a memory, a processor and the like, outputs, as shaft torque of an output shaft of the engine, a value obtained by subtracting the calculated consumption torque from base torque of the motor generator. The vibration damping torque calculating device further calculates vibration damping torque which is torque for suppressing a variation in the shaft torque calculated.

The "base torque" means torque required for the motor generator according to a state of the hybrid vehicle such as, for example, the number of revolutions of the engine. The details of a method of calculating the base torque are omitted because various known aspects can be applied.

The controlling device, which is provided with, for example, a memory, a processor and the like, controls the motor generator such that torque outputted from the motor generator is the sum of the base torque and the calculated vibration damping torque.

Here, according to the study of the present inventors, the following matter has been found. In the steady state in which there is no change (or little change) in the number of revolutions of the engine, the relation between the pulsating torque of the engine and the inertia torque of the engine is unambiguously or uniquely determined. Thus, only one of the pulsating torque and the inertia torque is considered in the vibration damping control in many cases. However, in a state in which there is a variation in the number of revolutions such as when the engine starts or stops, the relation between the pulsating torque and the inertia torque changes (i.e. is not unambiguous or unique). It is therefore hard to accurately perform the vibration damping control if only one of the pulsating torque and the inertia torque is considered.

In the present invention, however, as described above, each of the pulsating torque and the first inertia torque is calculated, and the vibration damping torque is obtained on the basis of the calculated pulsating torque and the calculated first inertia torque. It is thus possible to preferably perform the vibration damping control even in the transitional period of the number of revolutions of the engine.

In one aspect of the vibration damping control apparatus of the present invention, the vibration damping control apparatus is further provided with a second inertia torque calculating device configured to calculate second inertia torque which is inertia torque of the motor generator, wherein the consumption torque calculating device sets, as the consumption torque, a value obtained by subtracting (i) the calculated first inertia torque and (ii) the calculated second inertia torque from the calculated pulsating torque.

According to this aspect, even in a hybrid vehicle provided with a power transmission system in which a spring element such as, for example, a damper is disposed between the engine and the motor generator, the vibration damping control can be preferably performed, which is extremely useful in practice.

The "second inertia torque" of the present invention means torque generated with a change in the number of revolutions of the motor generator. The details of a method of calculating the second inertia torque are omitted because various known aspects can be applied.

In this aspect, the vibration damping control apparatus may be further provided with a resonance suppression controlling device configured to perform a predetermined resonance suppression process on at least one of the calculated first inertia torque and the calculated second inertia torque, in order to suppress a resonance phenomenon caused by each of the number of revolutions of the engine and the number of revolutions of the motor generator.

By virtue of such a configuration, it is possible to preferably perform the vibration damping control while suppressing the occurrence of the resonance phenomenon, which is extremely useful in practice.

In an aspect in which the resonance suppression controlling device is provided, the vibration damping control apparatus may be further provided with a filtering device configured to perform a filtering process for removing a particular frequency component from the shaft torque, wherein said vibration damping control apparatus prioritizes the filtering device if both the resonance suppression controlling device and the filtering device can be applied.

By virtue of such a configuration, the range of the control can be extended, which is extremely useful in practice.

Incidentally, both the resonance suppression controlling device and the filtering device may be applied.

In another aspect of the vibration damping control apparatus of the present invention, the vibration damping control apparatus is further provided with a filtering device configured to perform a filtering process for removing a particular frequency component from the shaft torque.

According to this aspect, the vibration can be suppressed more effectively, which is extremely useful in practice.

According to this aspect, the vibration damping control apparatus may be further provided with a resonance suppression controlling device configured to perform a predetermined resonance suppression process on at least one of the calculated first inertia torque and the calculated second inertia torque, in order to suppress a resonance phenomenon caused by each of the number of revolutions of the engine and the number of revolutions of the motor generator, wherein said vibration damping control apparatus prioritizes the filtering device if both the filtering device and the resonance suppression controlling device can be applied.

By virtue of such a configuration, the range of the control can be extended, which is extremely useful in practice.

The operation and other advantages of the present invention will become more apparent from embodiments explained below.

MODE FOR CARRYING OUT THE INVENTION

Hereinafter, embodiments of the vibration damping control apparatus of the present invention will be explained with reference to the drawings.
<First Embodiment>

Figure 2:
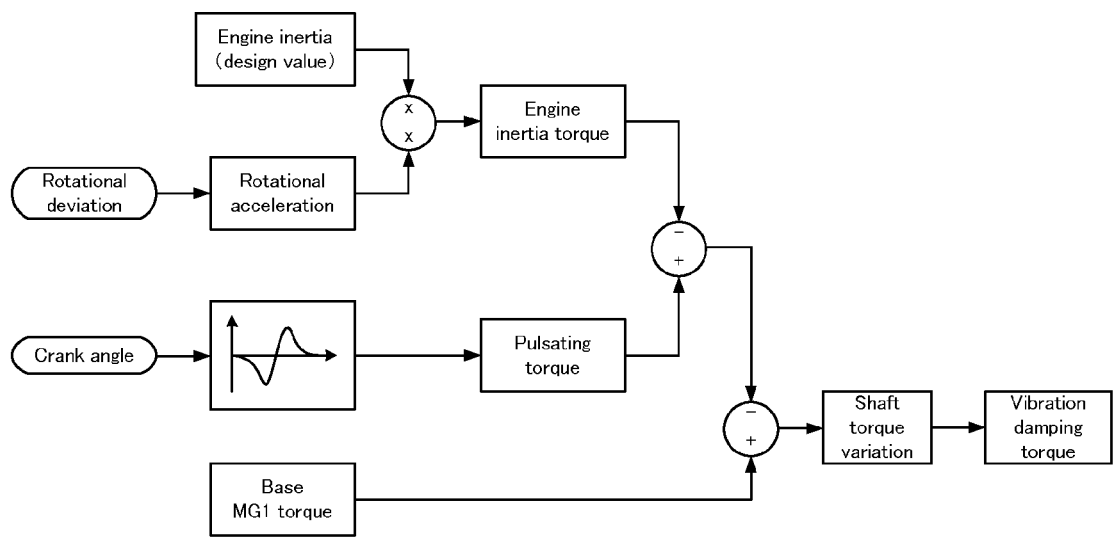
FIG. 2 is a diagram illustrating a vibration damping control process in the first embodiment.
Figure 3:
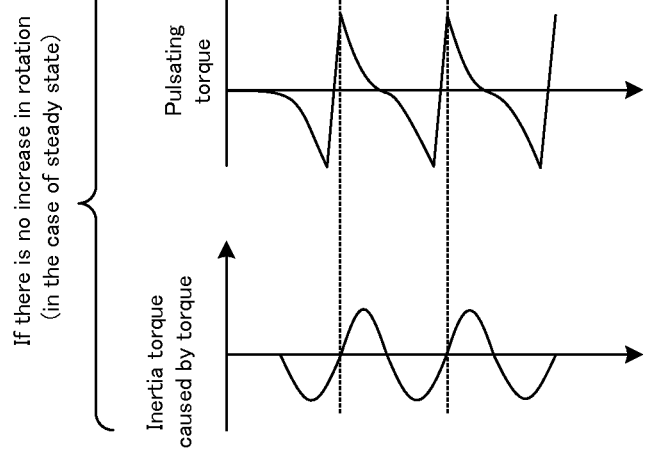
FIG. 3 are diagrams each of which illustrates one example of respective one of pulsating torque, inertia torque, cranking torque, and the number of engine revolutions.
Figure 3:
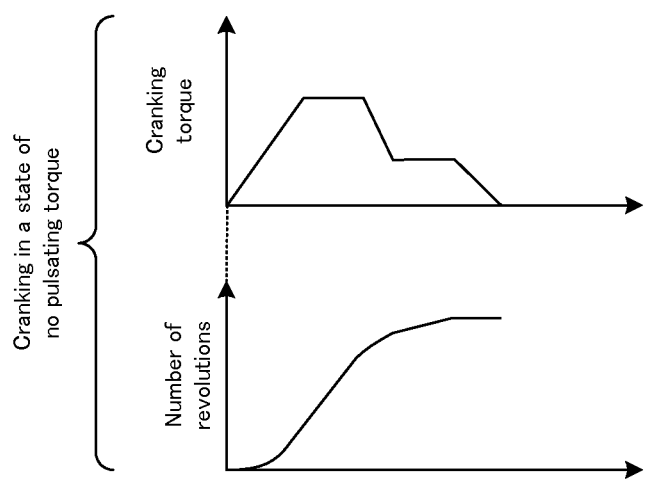
Figure 3:
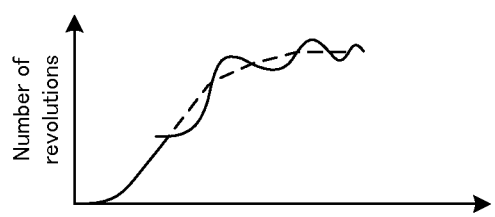

A first embodiment of the vibration damping control apparatus of the present invention will be explained with reference to FIG. 1 to FIG. 3.

<Vehicle Configuration>

Firstly, a configuration of a hybrid vehicle in this embodiment will be explained with reference to FIG. 1. FIG. 1 is a schematic block diagram illustrating a schematic configuration of the hybrid vehicle in the first embodiment.

Figure 1:
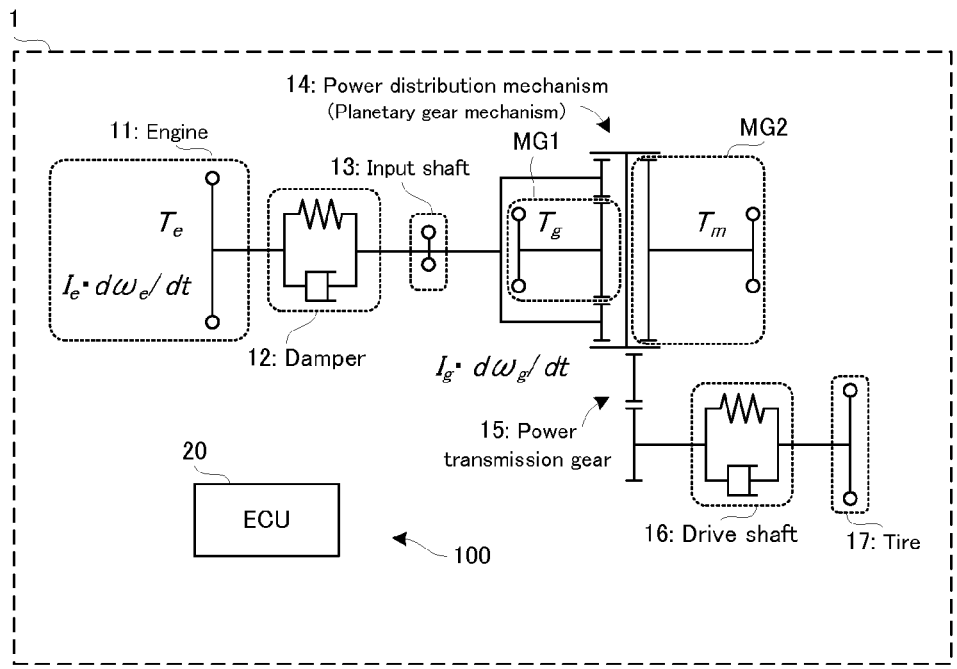
FIG. 1 is a schematic block diagram illustrating a schematic configuration of a hybrid vehicle in a first embodiment.

In FIG. 1, a hybrid vehicle 1 is provided with an engine 11, a damper 12, a power distribution mechanism 14, a motor generator MG1, a motor generator MG2, and an electronic control unit (ECU) 20.

A crankshaft of the engine 11 is coupled with one end of the damper 12, and an input shaft 13 is coupled with the other end of the damper 12.

The power distribution mechanism 14 is provided with a sun gear, a pinion gear, a carrier configured to support the pinion gear so that the pinion gear can rotate on its axis and can revolve, and a ring gear. The sun gear is configured to rotate integrally with a rotator of the motor generator MG1. The carrier is configured to rotate integrally with the input shaft 13.

A power output gear of the power distribution mechanism 14 transmits power to a power transmission gear 15 via a chain belt (not illustrated). The power transmitted to the power transmission gear 15 is transmitted to a tire (or a driving wheel) 17 via a drive shaft 16.

The ECU 20 controls the engine 11, the motor generator MG1 and the motor generator MG2 and the like, on the basis of output signals from, for example, a crank angle sensor (not illustrated), a resolver (not illustrated) configured to detect the number of revolutions of the motor generator MG1, a resolver (not illustrated) configured to detect the number of revolutions of the motor generator MG2, or the like.

The vibration damping control apparatus 100 is provided with the ECU 20. In the embodiment, namely, a part of the function of the ECU 20 for various electronic control of the hybrid vehicle 1 is used as a part of the vibration damping control apparatus 100.

(Vibration Damping Control Process)

Next, the balance of power in a power transmission system of the hybrid vehicle 1 will be explained. Here, the balance of power when the engine 11 starts will be explained.

Cranking torque (i.e. base torque) required for the motor generator MG1 is expressed by the following equation (1).

[Equation 1]

$$T_g = -\frac{\rho}{1+\rho} \cdot T_e + I_g \cdot \frac{d\omega_g}{dt} + \frac{\rho}{1+\rho} \cdot I_e \cdot \frac{d\omega_e}{dt} \quad (1)$$

wherein "$T_g$" is required cranking torque, "$\rho$" is a gear ratio, "$T_e$" is pulsating torque of the engine 11, "$I_g$" is inertia of the motor generator MG1, "$d\omega_g/dt$" is a rotation acceleration of the motor generator MG1, "$I_e$" is inertia of the engine 11, and "$d\omega_e/dt$" is a rotation acceleration of the engine 11.

If the engine 11 and the motor generator MG1 operate ideally, the rotation acceleration of the motor generator MG1 is expressed by the following equation (2).

[Equation 2]

$$\frac{d\omega_g}{dt} = \frac{\rho}{1+\rho} \cdot \frac{d\omega_e}{dt} \quad (2)$$

If the equation (2) is substituted in the aforementioned equation (1), the required cranking torque $T_g$ is expressed by the following equation (3).

[Equation 3]

$$T_g = \frac{\rho}{1+\rho}\left\{\left(I_e + \frac{\rho}{1+\rho} \cdot I_e\right) \cdot \frac{d\omega_e}{dt} - T_e\right\} \quad (3)$$

If the aforementioned equation (1) is arranged, ideal torque balance is expressed by the following equation (4).

[Equation 4]

$$T_g + \frac{\rho}{1+\rho} \cdot T_e = I_g \cdot \frac{d\omega_g}{dt} + \frac{\rho}{1+\rho} \cdot I_e \cdot \frac{d\omega_e}{dt} \quad (4)$$

In practice, however, the left side and the right side of the equation (4) do not balance each other, and excessive shaft torque is thus generated. The excessive shaft torque is expressed by the following equation (5).

[Equation 5]

$$T_{e,\rho} = \left(T_e - I_e \cdot \frac{d\omega_e}{dt}\right) + \left\{\frac{1+\rho}{\rho} \cdot \left(T_g - I_g \cdot \frac{d\omega_g}{dt}\right)\right\} \quad (5)$$

wherein "$T_{e,\rho}$" is the excessive shaft torque.

The vibration damping control apparatus 100 performs the vibration damping control by correcting the required cranking torque $T_g$ such that the excessive shaft torque $T_{e,\rho}$ becomes zero in the aforementioned equation (5). Next, a vibration damping control process performed by the vibration damping control apparatus 100 will be specifically explained with reference to FIG. 2. FIG. 2 is a diagram illustrating the vibration damping control process in the first embodiment.

The ECU 20 as a part of the vibration damping control apparatus 100 calculates first inertia torque, which is inertia torque of the engine 11, by obtaining the product of the inertia $I_e$ of the engine 11 and the rotational acceleration $d\omega_e/dt$ based on the output signal from the crank angle sensor. Here, the "inertia torque" means torque generated with a variation in the number of revolutions. The inertia $I_e$ of the engine 11 is a fixed value set in advance. The details of a more specific method of calculating the inertia torque are omitted because various known aspects can be applied.

In parallel with the calculation of the inertia torque, the ECU 20 calculates the pulsating torque $T_e$ according to a crank angle based on the output signal from the crank angle sensor, or the like. Here, the "pulsating torque $T_e$" means the sum of compression torque and reciprocating inertia torque of a piston system of the engine 11. The pulsating torque $T_e$ may be calculated in view of an operating state such as, for example, temperature and atmospheric pressure, in addition to the crank angle. The details of a method of calculating the pulsating torque $T_e$ are omitted because various known aspects can be applied.

Then, the ECU 20 calculates, as consumption torque, a value (i.e. $T_e - I_e \cdot d\omega_e/dt$) obtained by subtracting the calculated first inertia torque from the calculated pulsating torque $T_e$. The ECU 20 then calculates, as the excessive shaft torque $T_{e,\rho}$, a value (i.e. "$T_g - (T_e - I_e \cdot d\omega_e/dt)$") obtained by subtracting the calculated consumption torque from the base torque (i.e. the required cranking torque $T_g$) of the motor generator MG1.

Then, the ECU 20 calculates vibration damping torque which is torque that allows a (time) variation in the calculated excessive shaft torque $T_{e,\rho}$ to be suppressed (i.e. that allows the excessive shaft torque $T_{e,\rho}$ to approach zero). The ECU 20 then controls the motor generator MG1 while the sum of the base torque $T_g$ and the calculated vibration damping torque is used as new required torque of the motor generator MG1.

Now, according to the study of the present inventors, the following matter has been found. As illustrated in FIG. 3(a), if there is no variation in the number of revolutions of the engine 11 (which herein means "the average number of revolutions in a predetermined period such as, for example, one cycle") (i.e. in the case of the steady state), a relation between the pulsating torque and the inertia torque caused by the pulsating torque (i.e. the inertia torque associated with an instantaneous change in the number of revolutions) is unambiguously or uniquely determined. Moreover, as illustrated in FIG. 3(b), if there is no pulsating torque (i.e. in theory), a relation between the cranking torque and the amount of increase in the number of revolutions is unambiguously determined.

In practice, the pulsating torque is generated during cranking of the engine, and the rotational variation caused by the pulsating torque occurs while the number of revolutions increases. Therefore, the inertia torque variation sequentially changes (refer to FIG. 3(c)). Incidentally, FIG. 3 illustrate one example of the pulsating torque, the inertia torque, the cranking torque, and the number of engine revolutions.

In the case of the steady state, the relation between the pulsating torque and the inertia torque is unambiguously determined. Thus, only one of the pulsating torque and the inertia torque is considered in the vibration damping control in many cases. In this case, there is a possibility that the vibration damping control is not appropriately performed in the transitional period of the number of engine revolutions such as, for example, when the engine starts or stops.

In the embodiment, however, as described above, the first inertia torque of the engine 11 and the pulsating torque $T_e$ are calculated, and the vibration damping control is performed on the basis of the calculated first inertia torque and the calculated pulsating torque $T_e$. Thus, the vibration damping control can be appropriately performed, even in the transitional period of the number of engine revolutions in which the relation between the pulsating torque $T_e$ and the first inertial torque is not constant.

The "ECU 20" in the embodiment is one example of the "pulsating torque calculating device", the "first inertia torque calculating device", the "consumption torque calculating device", the "vibration damping torque calculating device", and the "controlling device" of the present invention. The "motor generator MG1" in the embodiment is one example of the "motor generator" of the present invention.

In the vibration damping control in the embodiment, the required cranking torque $T_g$ of the motor generator MG1 is changed (or corrected). However, for example, torque in phase with the variation in the excessive shaft torque $T_{e,\rho}$ may be generated by the motor generator MG1, and torque out of phase with the variation in the excessive shaft torque $T_{e,\rho}$ may be also generated by the motor generator MG2. By virtue of such a configuration, it is possible to suppress the vibration caused by the excessive shaft torque $T_{e,\rho}$ while avoiding the resonance of the power transmission system of the hybrid vehicle 1. In view of the inertia torque of the motor generator MG2 or the like, it is also possible to suppress the vibration upon acceleration and deceleration during the driving of the hybrid vehicle 1.

<Second Embodiment>

Figure 4:
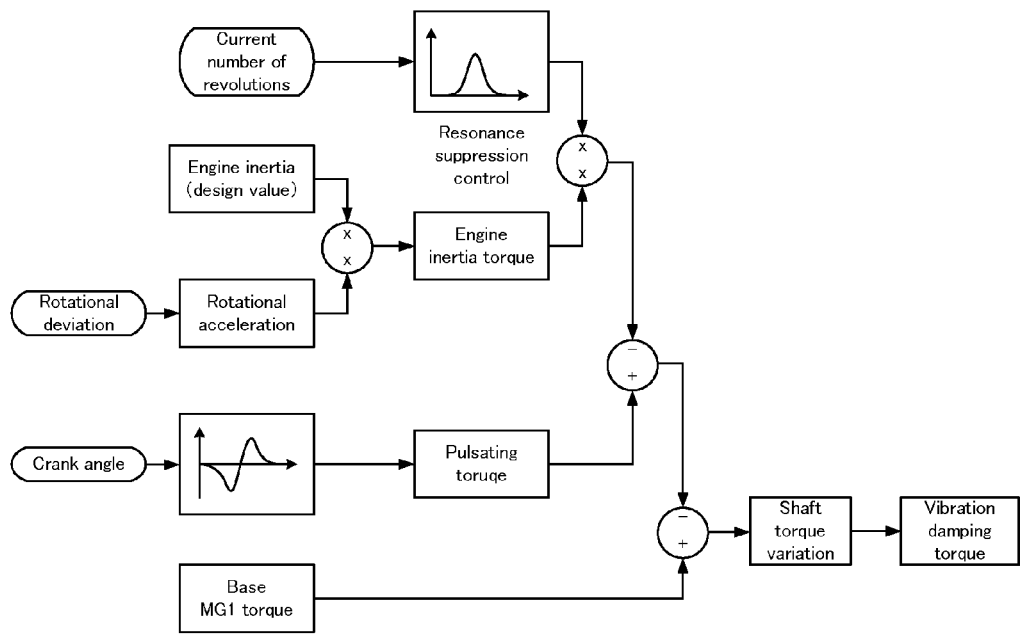
FIG. 4 is a diagram illustrating a vibration damping control process in a second embodiment.

A second embodiment of the vibration damping control apparatus of the present invention will be explained with reference to FIG. 4. The second embodiment has the same configuration as that of the first embodiment, except having a partially different vibration damping control process. Therefore, in the second embodiment, a duplication of the explanation in the first embodiment is omitted. Common portions on the drawing carry the same reference numerals, and only basically different points are explained with reference to FIG. 4. FIG. 4 is a diagram illustrating a vibration damping control process in the second embodiment, having the same concept as that of FIG. 2.

In FIG. 4, the ECU 2 determines a vibration damping gain for a predetermined resonance frequency, according to the current number of revolutions of the engine 11 based on the output signal from the crank angle sensor. The ECU 20 then obtains the product of the calculated first inertia torque and the determined vibration damping gain (hereinafter referred to as "first inertia torque subject to resonance suppression", as occasion demands). The ECU 20 then calculates the consumption torque by subtracting the first inertia torque subject to the resonance suppression from the calculated pulsating torque $T_e$.

Here, the following has been found from the study of the present inventors; namely, as in the hybrid vehicle 1, if the damper 12 (i.e. the spring element) is disposed between the engine 11 and the motor generator MG1, the power transmission system of the hybrid vehicle 1 is resonated due to torsion of the damper 12, depending on the number of revolutions of the engine 11 (and the motor generator MG1).

As a result, it is possible to suppress the vibration caused by the excessive shaft torque $T_{e,\rho}$ while suppressing the resonance. Control for suppressing the resonance (i.e. resonance suppression control) is performed only on the inertia torque which provides a change according to the number of revolutions. The "ECU 20" in the embodiment is one example of the "resonance suppression controlling device" of the present invention.

<Third Embodiment>

Figure 5:
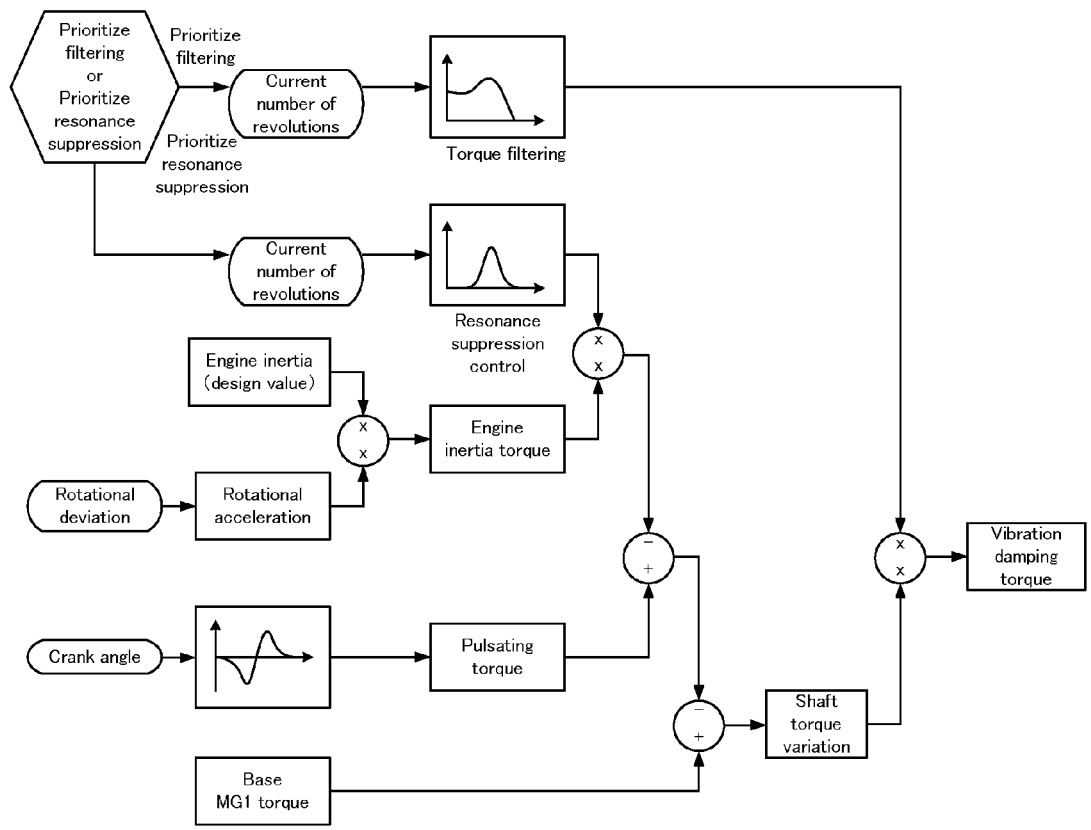
FIG. 5 is a diagram illustrating a vibration damping control process in a third embodiment.

A third embodiment of the vibration damping control apparatus of the present invention will be explained with reference to FIG. 4. The third embodiment has the same configuration as that of the second embodiment, except having a partially different vibration damping control process. Therefore, in the third embodiment, a duplication of the explanation in the second embodiment is omitted. Common portions on the drawing carry the same reference numerals, and only basically different points are explained with reference to FIG. 5. FIG. 5 is a diagram illustrating a vibration damping control process in the third embodiment, having the same concept as that of FIG. 2.

In FIG. 5, the ECU 20 determines which of the resonance suppression control and torque filtering control described later is to be performed, for example, according to a driving state of the hybrid vehicle 1 or the like. Here, in an area in which both the resonance suppression control and the torque filtering control can be applied, the ECU 20 prioritizes the torque filtering control. The ECU 20 may perform both the resonance suppression control and the torque filtering control.

If it is determined that the torque filtering control is to be performed, the ECU 20 determines a filter for removing a particular frequency component, according to the current number of revolutions of the engine 11 based on the output signal from the crank angle sensor.

In parallel with the determination of the filter, the ECU 20 obtains the consumption torque by subtracting the first inertia torque of the engine 11 from the pulsating torque $T_e$ of the engine 11. The ECU 20 further obtains the excessive shaft torque $T_{e,\rho}$ by subtracting the calculated consumption torque from the base torque $T_g$ of the motor generator MG1. The ECU 20 then performs a filtering process using the determined filter on the variation in the excessive shaft torque $T_{e,\rho}$, and calculates the vibration damping torque.

If it is determined that the resonance suppression control is to be performed, the ECU 20 calculates the consumption torque by subtracting the product of the calculated first inertia torque and the determined vibration damping gain from the calculated pulsating torque $T_e$. The ECU 20 then obtains the excessive shaft torque $T_{e,\rho}$ by subtracting the calculated consumption torque from the base torque $T_g$ of the motor generator MG1. The ECU 20 then calculates the vibration damping torque in order to suppress the variation in the excessive shaft torque $T_{e,\rho}$ calculated.

The "ECU 20" in the embodiment is one example of the "filtering device" and the "determining device" of the present invention.

<Fourth Embodiment>

Figure 6:
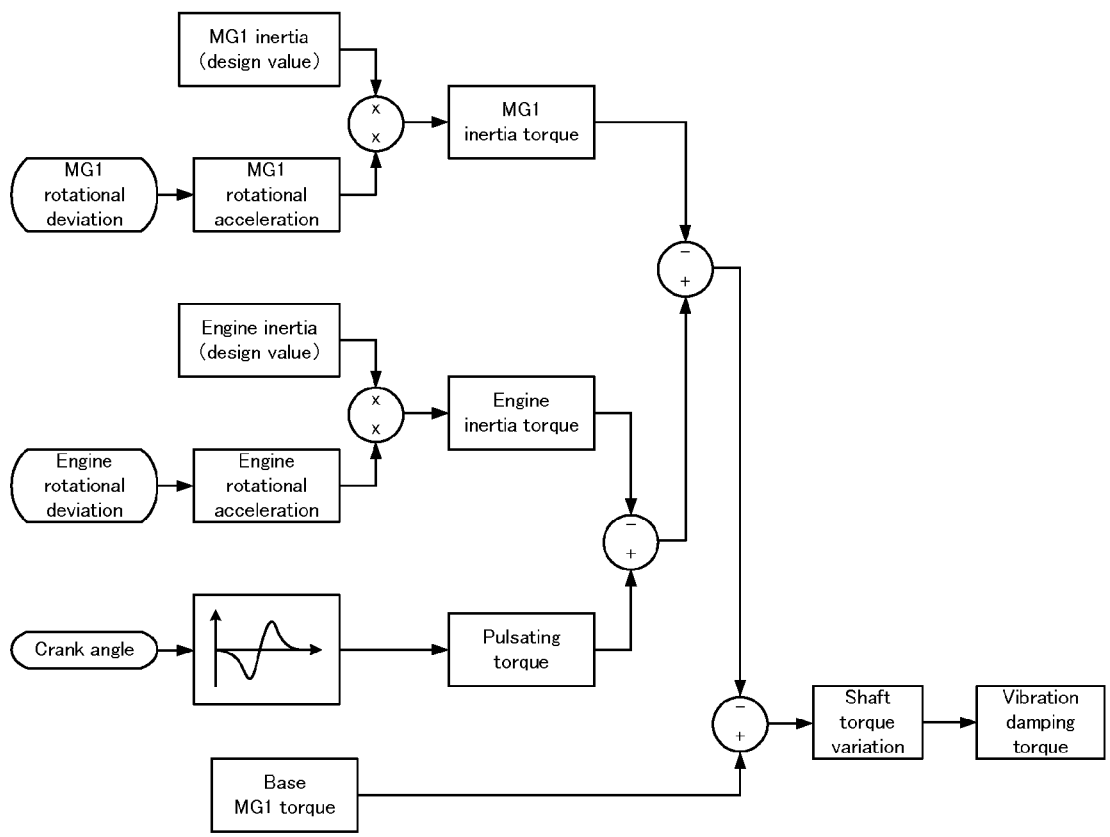
FIG. 6 is a diagram illustrating a vibration damping control process in a fourth embodiment.

A fourth embodiment of the vibration damping control apparatus of the present invention will be explained with reference to FIG. 6. The fourth embodiment has the same configuration as that of the first embodiment, except having a partially different vibration damping control process. Therefore, in the fourth embodiment, a duplication of the explanation in the first embodiment is omitted. Common portions on the drawing carry the same reference numerals, and only basically different points are explained with reference to FIG. 6. FIG. 6 is a diagram illustrating a vibration damping control process in the fourth embodiment, having the same concept as that of FIG. 2.

In FIG. 6, the ECU 20 calculates second inertia torque, which is inertia torque of the motor generator MG1, by obtaining the product of the inertia $I_g$ of the motor generator MG1 and the rotational acceleration $d\omega_g/dt$ based on the output signal from the resolver. The inertia $I_g$ of the motor generator MG1 is a fixed value set in advance.

Then, the ECU 20 obtains, as the consumption torque, a value (i.e. "$T_e-I_e \cdot d\omega_e/dt-I_g \cdot d\omega_g/dt$") obtained by subtracting the first inertia torque of the engine 11 and the calculated second inertia torque from the calculated pulsating torque $T_e$ of the engine 11.

The ECU 20 then calculates, as the excessive shaft torque $T_{e,\rho}$, a value (i.e. "$T_g-(T_e-I_e \cdot d\omega_e/dt-I_g \cdot d\omega_g/dt)$") obtained by subtracting the calculated consumption torque from the base torque $T_g$ of the motor generator MG1.

As described above, in view of the second inertia torque of the motor generator MG1, it is possible to appropriately perform the vibration damping control, even if there is a possibility that the rotational deviation of the engine 11 and the rotational deviation of the motor generator MG1 are different from each other particularly due to the spring element such as the damper 12. The "ECU 20" in the embodiment is one example of the "second inertia torque calculating device" of the present invention.

<Fifth Embodiment>

Figure 7:
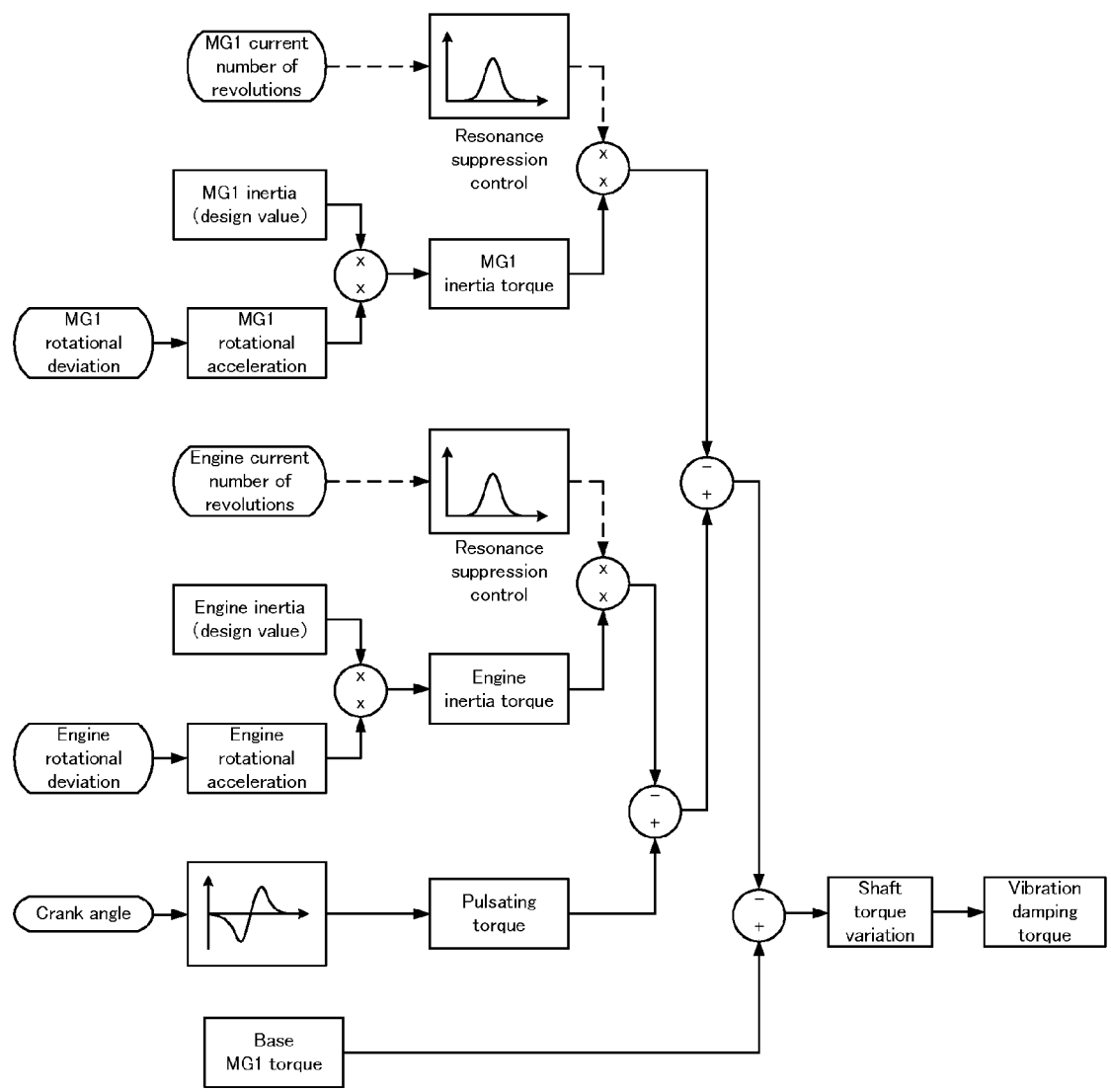
FIG. 7 is a diagram illustrating a vibration damping control process in a fifth embodiment.

A fifth embodiment of the vibration damping control apparatus of the present invention will be explained with reference to FIG. 7. The fifth embodiment has the same configuration as that of the fourth embodiment, except having a partially different vibration damping control process. Therefore, in the fifth embodiment, a duplication of the explanation in the fourth embodiment is omitted. Common portions on the drawing carry the same reference numerals, and only basically different points are explained with reference to FIG. 7. FIG. 7 is a diagram illustrating a vibration damping control process in the fifth embodiment, having the same concept as that of FIG. 2.

(In a Case where the Resonance Suppression is Performed on Both the First Inertia Torque and the Second Inertia Torque)

In FIG. 7, the ECU 20 determines a vibration damping gain for a predetermined resonance frequency, according to the current number of revolutions of the motor generator MG1 based on the output signal from the resolver. The ECU 20 then obtains the product of the calculated second inertia torque and the determined vibration damping gain (hereinafter referred to as "second inertia torque subject to resonance suppression", as occasion demands). The ECU 20 then calculates the consumption torque by subtracting the first inertia torque subject to the resonance suppression and the second inertia torque subject to the resonance suppression from the calculated pulsating torque $T_e$ of the engine 11.

(In a Case where the Resonance Suppression is Performed Only on the First Inertia Torque)

The ECU 20 calculates the consumption torque by subtracting the first inertia torque subject to the resonance suppression and the calculated second inertia torque from the calculated pulsating torque $T_e$ of the engine 11.

(In a Case where the Resonance Suppression is Performed Only on the Second Inertia Torque)

The ECU 20 calculates the consumption torque by subtracting the calculated first inertia torque and the second inertia torque subject to the resonance suppression from the calculated pulsating torque $T_e$ of the engine 11.

<Sixth Embodiment>

Figure 8:
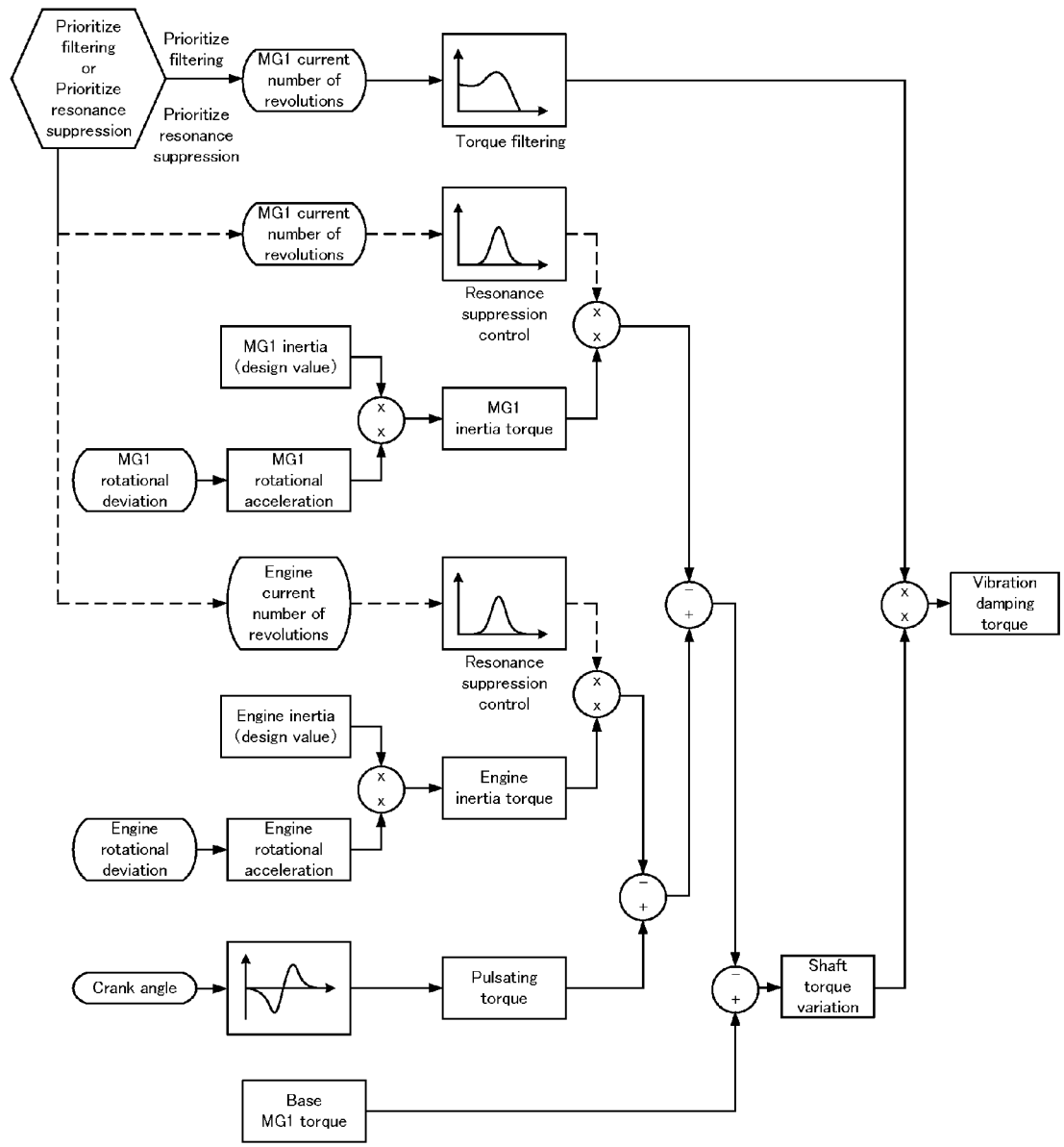
FIG. 8 is a diagram illustrating a vibration damping control process in a sixth embodiment.

A sixth embodiment of the vibration damping control apparatus of the present invention will be explained with reference to FIG. 8. The sixth embodiment has the same configuration as that of the fifth embodiment, except having a partially different vibration damping control process. Therefore, in the sixth embodiment, a duplication of the explanation in the fifth embodiment is omitted. Common portions on the drawing carry the same reference numerals, and only basically different points are explained with reference to FIG. 8. FIG. 8 is a diagram illustrating a vibration damping control process in the sixth embodiment, having the same concept as that of FIG. 2.

In FIG. 8, the ECU 20 determines which of the resonance suppression control and the torque filtering control is to be performed, for example, according to the driving state of the hybrid vehicle 1 or the like. Here, in the area in which both the resonance suppression control and the torque filtering control can be applied, the ECU 20 prioritizes the torque filtering control. The ECU 20 may perform both the resonance suppression control and the torque filtering control.

If it is determined that the torque filtering control is to be performed, the ECU 20 determines a filter for removing a particular frequency component, according to the current number of revolutions of the MG1 based on the output signal from the resolver.

In parallel with the determination of the filter, the ECU 20 obtains the consumption torque by subtracting the first inertia torque of the engine 11 and the second inertia torque of the motor generator MG1 from the pulsating torque $T_e$ of the engine 11. The ECU 20 further obtains the excessive shaft torque $T_{e,\rho}$ by subtracting the calculated consumption torque from the base torque $T_g$ of the motor generator MG1. The ECU 20 then performs a filtering process using the determined filter on the variation in the excessive shaft torque $T_{e,\rho}$, and calculates the vibration damping torque.

If it is determined that the resonance suppression control is to be performed, the ECU 20 calculates the consumption torque as follows.

(In the Case where the Resonance Suppression is Performed on Both the First Inertia Torque and the Second Inertia Torque)

The ECU 20 calculates the consumption torque by subtracting the first inertia torque subject to the resonance suppression and the second inertia torque subject to the resonance suppression from the calculated pulsating torque $T_e$ of the engine 11.

(In the Case where the Resonance Suppression is Performed Only on the First Inertia Torque)

The ECU 20 calculates the consumption torque by subtracting the first inertia torque subject to the resonance suppression and the calculated second inertia torque from the calculated pulsating torque $T_e$ of the engine 11.

(In the Case where the Resonance Suppression is Performed Only on the Second Inertia Torque)

The ECU 20 calculates the consumption torque by subtracting the calculated first inertia torque and the second inertia torque subject to the resonance suppression from the calculated pulsating torque $T_e$ of the engine 11.

After the calculation of the consumption torque, the ECU 20 obtains the excessive shaft torque $T_{e,\rho}$ by subtracting the calculated consumption torque from the base torque $T_g$ of the motor generator MG1. The ECU 20 then calculates the vibration damping torque in order to suppress the variation in the excessive shaft torque $T_{e,\rho}$ calculated.

The present invention is not limited to the aforementioned embodiment, but various changes may be made, if desired, without departing from the essence or spirit of the invention which can be read from the claims and the entire specification. A vibration damping control apparatus, which involves such changes, is also intended to be within the technical scope of the present invention.

DESCRIPTION OF REFERENCE NUMERALS 1 hybrid vehicle
11 engine
12 damper
13 input shaft
14 power distribution mechanism
15 power transmission gear
16 drive shaft
17 tire
20 ECU
100 vibration damping control apparatus
MG1, MG2 motor generator

The invention claimed is:

1. A vibration damping control apparatus mounted on a hybrid vehicle comprising an engine and a motor generator coupled with the engine, said vibration damping control apparatus comprising:
an ECU configured
to calculate a pulsating torque of the engine;
to calculate a first inertia torque which is an inertia torque of the engine;
to set, as a consumption torque, a value obtained by subtracting the calculated first inertia torque from the calculated pulsating torque;
to set, as a shaft torque of an output shaft of the engine, a value obtained by subtracting the calculated consumption torque from a base torque of the motor generator, and to calculate a vibration damping torque which is a torque for suppressing a variation in the shaft torque; and
to control the motor generator such that a torque outputted from the motor generator is a sum of the base torque and the calculated vibration damping torque.

2. The vibration damping control apparatus according to claim 1, said ECU further calculates a second inertia torque which is an inertia torque of the motor generator, wherein
said ECU sets, as the consumption torque, a value obtained by subtracting (i) the calculated first inertia torque and (ii) the calculated second inertia torque from the calculated pulsating torque.

3. The vibration damping control apparatus according to claim 2, said ECU further performs a predetermined resonance suppression process on at least one of the calculated first inertia torque and the calculated second inertia torque, in order to suppress a resonance phenomenon caused by each of the number of revolutions of the engine and the number of revolutions of the motor generator.

4. The vibration damping control apparatus according to claim 3, said ECU further performs a filtering process for removing a particular frequency component from the shaft torque, wherein
said ECU prioritizes the filtering process if both the resonance suppression controlling process and the filtering process can be applied.

5. The vibration damping control apparatus according to claim 2, said ECU further performs a filtering process for removing a particular frequency component from the shaft torque.

6. The vibration damping control apparatus according to claim 5, said ECU further performs a predetermined resonance suppression process on at least one of the calculated first inertia torque and the calculated second inertia torque, in order to suppress a resonance phenomenon caused by each of the number of revolutions of the engine and the number of revolutions of the motor generator, wherein
said ECU prioritizes the filtering process if both the filtering process and the resonance suppression controlling process can be applied.

7. A vibration damping control method for a hybrid vehicle comprising an engine and a motor generator coupled with the engine, said vibration damping control method comprising:
calculating a pulsating torque of the engine;
calculating a first inertia torque which is an inertia torque of the engine;
setting, as a consumption torque, a value obtained by subtracting the calculated first inertia torque from the calculated pulsating torque;
setting, as a shaft torque of an output shaft of the engine, a value obtained by subtracting the calculated consumption torque from a base torque of the motor generator, and calculating a vibration damping torque which is a torque for suppressing a variation in the shaft torque; and
controlling the motor generator such that a torque outputted from the motor generator is a sum of the base torque and the calculated vibration damping torque.

* * * * *